US010121261B2

United States Patent
Kherroubi et al.

(10) Patent No.: US 10,121,261 B2
(45) Date of Patent: Nov. 6, 2018

(54) AUTOMATIC DIP PICKING IN BOREHOLE IMAGES

(71) Applicant: Schlumberger Technology Corporation, Sugar Land, TX (US)

(72) Inventors: Josselin Kherroubi, Clamart (FR); Enric Meinhardt-Llopis, Gentilly (FR); Raffaele Grompone, Gentilly (FR); Joris Costes, Gentilly (FR); Gabriele Facciolo, Gentilly (FR); Jean-Michel Morel, Gentilly (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/636,232

(22) Filed: Jun. 28, 2017

(65) Prior Publication Data
US 2017/0372490 A1    Dec. 28, 2017

(30) Foreign Application Priority Data

Jun. 28, 2016 (EP) .................................... 16290116

(51) Int. Cl.
*G06K 9/00* (2006.01)
*G06T 7/73* (2017.01)
*E21B 47/00* (2012.01)
*E21B 49/00* (2006.01)
(Continued)

(52) U.S. Cl.
CPC ............ *G06T 7/74* (2017.01); *E21B 47/0002* (2013.01); *E21B 49/00* (2013.01); *G01V 1/50* (2013.01); *G06K 9/40* (2013.01); *G06K 9/4633* (2013.01); *E21B 47/18* (2013.01); *G01V 2210/27* (2013.01); *G06T 3/40* (2013.01); *G06T 5/002* (2013.01);
(Continued)

(58) Field of Classification Search
None
See application file for complete search history.

(56) References Cited

U.S. PATENT DOCUMENTS 3,069,654 A    12/1962    Hough
5,162,994 A    11/1992    Torres
(Continued)

FOREIGN PATENT DOCUMENTS

WO        WO0184187 A1    11/2001

OTHER PUBLICATIONS

Duda, R. O. and Hart, P. E, Use of the Hough Transform to Detect Lines and Curves in Pictures, ACM, v. 15, n. 1 pp. 11-15.
(Continued)

*Primary Examiner* — Atiba O Fitzpatrick
(74) *Attorney, Agent, or Firm* — Michael Dae

(57) ABSTRACT

The techniques and device provided herein relate to receiving, via a processor, image data representative of a borehole of a well. The technique may include generating dequantized image data based on the image data, such that the dequantized image data filters one or more artifacts present in a Hough transformed version of the image data. One or more dip orientations (inclination and azimuth) associated with one or more formation dips present in the image data may be determined based on the dequantized image data. The technique may also include performing an a-contration validation algorithm for for the one or more formation dips to verify whether at least a formation dip having the or one of the possible dip orientation is present at a predetermined measured depth in the image data.

15 Claims, 5 Drawing Sheets

(51) Int. Cl.
*G06K 9/40* (2006.01)
*G06K 9/46* (2006.01)
*G01V 1/50* (2006.01)
*E21B 47/18* (2012.01)
*G06T 3/40* (2006.01)
*G06T 5/00* (2006.01)
*G06T 5/20* (2006.01)

(52) U.S. Cl.
CPC ...... *G06T 5/20* (2013.01); *G06T 2207/20061* (2013.01); *G06T 2207/30184* (2013.01)

(56) References Cited

U.S. PATENT DOCUMENTS

| | | |
|---|---|---|
| 5,960,371 A | 9/1999 | Saito et al. |
| 7,236,887 B2 | 6/2007 | Wang et al. |
| 2015/0098627 A1 | 4/2015 | Ye |

OTHER PUBLICATIONS

J. Illingworth and J. Kittler, "A Survey of the Hough Transform" Computer Vision, Graphics and Image Processing, vol. 14, (1988) pp. 87-116.

Lei Xu, Erkki Oja and Pekka Kultanen, A new curve detection method: Randomized Hough transform (RHT), Pattern Recognition Letters, vol. 11, No. 5 (1990), pp. 331-338.

A. Desolneux, S. Ladjal, L. Moisan and J.-M. Morel, Dequantizing Image Orientation, IEEE Transactions on Image Processing, vol. 11(10), pp. 1129-1140, Oct. 2002.

J. Weickert, M. Welk: Tensor field interpolation with PDEs. In Visualization and Processing of Tensor Fields, 315-325, Springer, Berlin, 2006.

W. Förstner, E. Guölch, A fast operator for detection and precise location of distinct points, corners and centres of circular features, Proc. ISPRS Intercommission Conference on Fast Processing of Photogrammetric Data, 1987, pp. 281-305.

Simoncelli, E. P. (1994). Design of multi-dimensional derivative filters. In Image Processing, 1994. Proceedings. ICIP-94., IEEE International Conference (vol. 1, pp. 790-794 vol. 1).

Rafael Grompone von Gioi, Jérémie Jakubowicz, Jean-Michel Morel, and Gregory Randall, LSD: a Line Segment Detector, Image Processing on Line, 2 (2012), pp. 35-55.

Nicolas Widynski et al., "A Contrario edge detection with edgelets" Signal and Image processing applications, 2011 IEEE International Conference on, IEEE, Nov. 16, 2011, pp. 421-426.

Extended Search Report issued in the related EP Application 16290116.9, dated Dec. 22, 2016.

AUTOMATIC DIP PICKING IN BOREHOLE IMAGES

CROSS-REFERENCE TO RELATED APPLICATIONS

The present application claims priority to EP Application No. 16290116.9, which was filed on Jun. 28, 2016, and is incorporated herein by reference in its entirety.

BACKGROUND

The disclosure relates to an apparatus and method of analyzing borehole images. More specifically, this disclosure relates to automatically dip picking on borehole images.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A well drilled through a geological formation may pass through numerous strata of different types of rock. The interfaces between different strata of the formation may be referred to as bed boundaries. The bed boundaries form part of the structure of the geological formation. Knowing the placement of the bed boundaries in the geological formation thus may help locate zones of interest, such as those that contain oil, gas, and/or water.

When imaging the borehole, geological planar surfaces (bed boundaries, fractures, faults, etc.) appear in the image as sinusoids and are called "dip". A dip is defined relative to a predetermined system of coordinates associated to the tool by two angles (apparent dip angle or apparent inclination relative to the axis of the borehole and apparent azimuth angle relative to a north axis projected on a tool section) and by a measured depth (curvilinear length of the borehole). The dip may also be converted in a "true" coordinate system (zenith, east, north) and in "true" depth using measurements performed in or near the borehole. In the following, the dip is always expressed in the apparent coordinates system (i.e. associated to the tool) and "dip angle", "inclination" or "azimuth angle" refers to "apparent dip angle", "apparent inclination" or "apparent azimuth angle".

The apparent formation dip, may be particularly useful both for drilling into the stratum of the formation where the zone of interest is located, as well as for locating the placement of the bed boundaries throughout the geological formation. Although there may be a variety of downhole tools that can image the wellbore, identifying formation dips from a borehole image in an accurate and time-efficient manner may prove to be a challenge.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to processing a borehole image to automatically identify dips in the borehole image in an efficient manner. In one embodiment, a data processing system may identify dips in a borehole image by first estimating a dip orientation (apparent dip angle and apparent azimuth angle), and then extracting individual dips having this dip orientation using an a contrario validation algorithm. The estimation of dip orientation is performed on a dequantized image, obtained from a preprocessing operation that may include performing image smoothing operations on the borehole image using a Gaussian blurring kernel, in order to correct the borehole image from quantization artifacts. The image smoothing may be performed at a selected scale level of the borehole image from which the dips may most likely be identified. Using multiple levels of smoothing (e.g., multiple sizes of blurring kernels) or different scales of the image, the data processing system may produce different blurred images, which may provide multi-resolution for the borehole image and a more robust image analysis process.

After smoothing the borehole image, the data processing system may estimate a dip orientation from the dequantized image (e.g., blurred image) using a sliding window. In one embodiment, the data processing system may use a Hough Transform image processing technique that has been adapted to the expected properties (e.g., sinusoid shape, periodic image, presence of absent values in case of pad-based images . . . ) of the dips in the borehole image.

After estimating the dip orientation from the dequantized images, the data processing system may use the dip orientation to guide the extraction of individual dips in the borehole image using an a contrario validation algorithm and determining estimated measured depths of each of the dips and determining estimated measured depths of each of the dips. As a result, the data processing system may determine the individual dips in the borehole image and the respective uncertainty values for the determined dips. Additional details with regard to identifying dips in a borehole image will be discussed below with reference to FIGS. 1-7.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled through a geological formation, the well may pass through numerous strata of different types of rock. Each of these may be referred to as a formation bed, and the interface between different beds may be referred to as a bed boundary. The bed boundaries form part of the structure of the geological formation. Knowing the placement of the bed boundaries in the geological formation thus may help locate zones of interest, such as those that contain oil, gas, and/or water. As previously explained, detecting dips on borehole images enables to get information on geological features of the borehole, in particular the bed boundaries.

Many downhole tools used for logging new wells obtain measurements of the formation supporting the wells. As mentioned above, a well-logging system may be used to obtain an image of borehole that may correspond to a well used to produce hydrocarbons from geological formations within the Earth. Moreover, the well-logging system may analyze the image of the borehole to identify locations and orientations of formation dips present in the geological formations.

Figure 1:
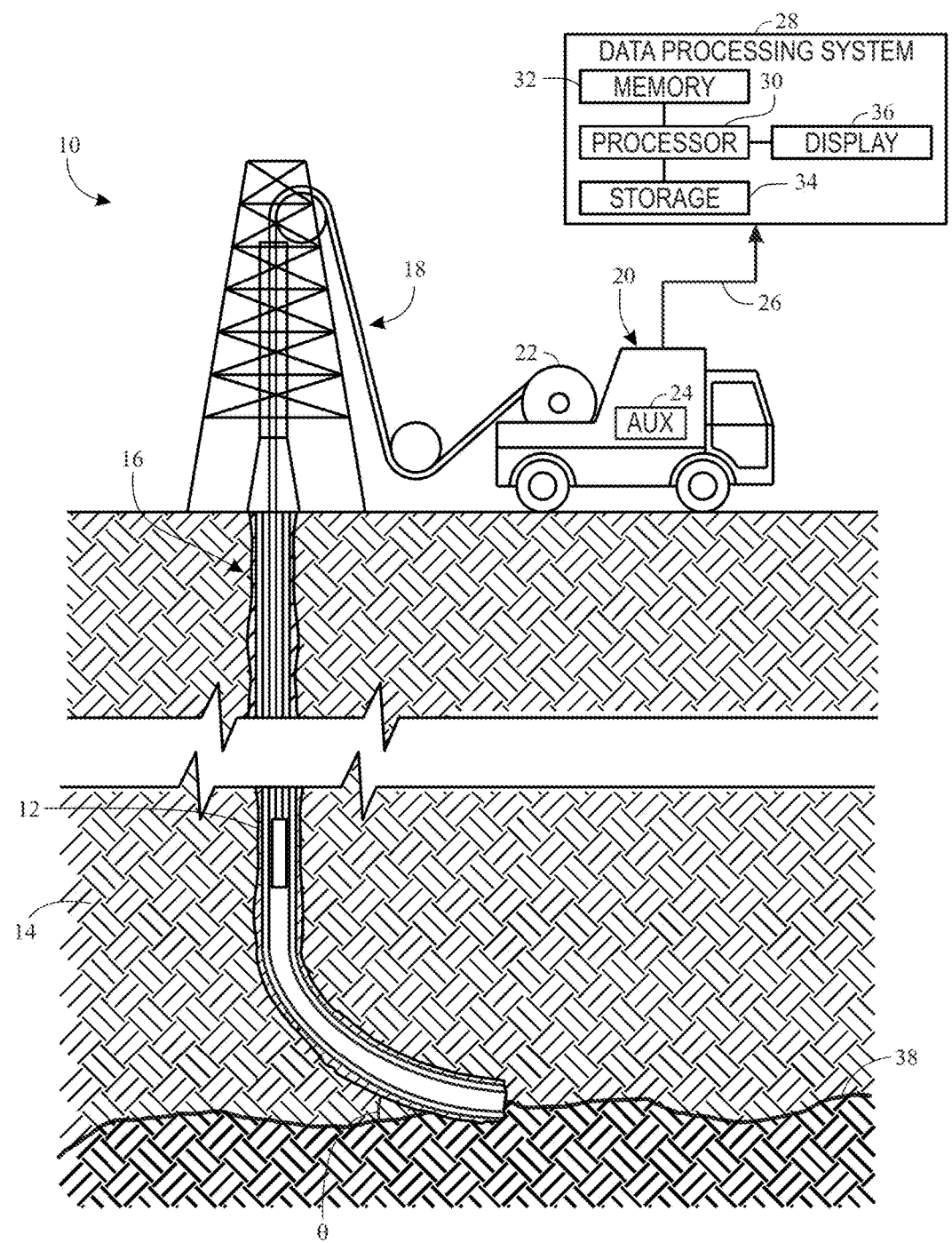
FIG. 1 is a schematic diagram of a well-logging system that acquires images of a borehole, in accordance with an embodiment.

With this in mind, FIG. 1 is a schematic diagram illustrating a well-logging system 10 that may obtain borehole images at variable depths of a formation, in accordance with an embodiment. The well-logging system 10 may be conveyed through a geological formation 14 via a wellbore 16. A downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that obtains multidimensional measurements through depths of the wellbore 16.

Many types of downhole tools may obtain measurements in the wellbore 16. For each depth of the wellbore 16 that is measured, the downhole tool 12 may generate log data (e.g., a borehole image, density, and/or photoelectric factor measurements). The downhole tool 12 may provide such measurements 26 to a data processing system 28 via any suitable telemetry (e.g., via electrical signals pulsed through the geological formation 14 or via mud pulse telemetry). The data processing system 28 may process the measurements 26 to identify patterns related to properties of the geological formation 14 or the wellbore 16. The patterns in the measurements 26 may indicate certain properties of the wellbore 16 (e.g., formation dip) that could be otherwise indiscernible by a human operator.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties of the wellbore 16 based on the measurements 26.

As will be discussed in more detail below, the data processing system 28 (or processing circuitry of the downhole tool 12) may use the measurements 26 (e.g., borehole image data) to determine locations of dips within the wellbore 16. The information regarding the locations of dips may provide additional desirable data for use in wellbore 16 evaluation. For example, structural analysis, sedimentary analysis, fracture analysis, and the like regarding the wellbore 16 may be determined based on the location and orientation of the dips present therein. Using the presently disclosed embodiments, the dips located at various depths of the wellbore 16 may be acquired to determine the locations of hydrocarbon deposits within the wellbore 16 and the like.

As shown in FIG. 1, the wellbore 16 may be at least partially horizontal and drilled through two different beds of the formation 14. A formation boundary 38 represents the planar interface between these different strata of the formation 14. The wellbore 16 intersects the formation boundary 38 at a relative angle θ.

Figure 2:
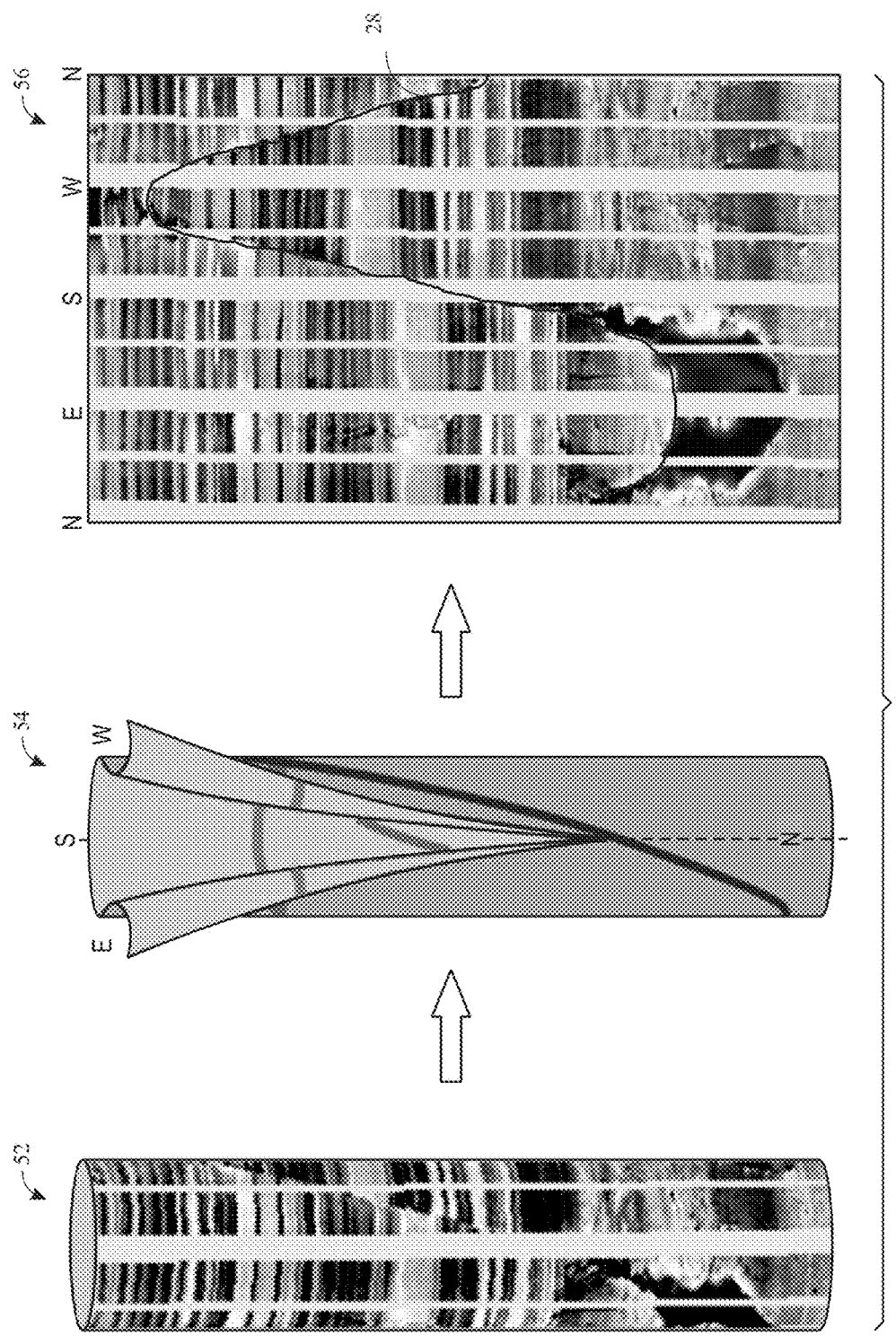
FIG. 2 is an example image of a borehole acquired by the well-logging system of FIG. 1, in accordance with an embodiment.

With the foregoing in mind, the borehole image data acquired via the downhole tool 12 may include high-resolution measurements that enable the data processing system 28 to characterize the location and orientation of the dips within the wellbore 16. In one embodiment, as shown in FIG. 2, the downhole tool 12 may acquire imaging measurements (e.g., borehole image data) on a cylinder-shaped borehole by rotating the downhole tool 12 and scanning 360° around the wellbore 16. After receiving the cylinder-borehole image data 52, the data processing system 28 may convert the cylinder-shaped image (e.g., 54) into a flat image 56 and acquire certain imaging measurements as a result of unrolling the cylinder-shaped image. As such, the apparent azimuth angle reads on the horizontal axis of the flat image 56 and the vertical axis represents the measured depth. By inspecting the flat image 56, the downhole tool 12 may enable someone to identify any planar event crossing the wellbore 16 based on a one period sinusoid 58 depicted on the flat image 56. In one embodiment, the data processing system 28 may analyze the flat image 56 and extract the sinusoid 58 after it has been identified. Based on the sinusoid 58, the data processing system 28 may then determine the dip orientation (dip inclination and azimuth), and, after that, the measured depth of the dip using the sinusoid characteristics (e.g. measured depth, amplitude, phase).

Figure 3:
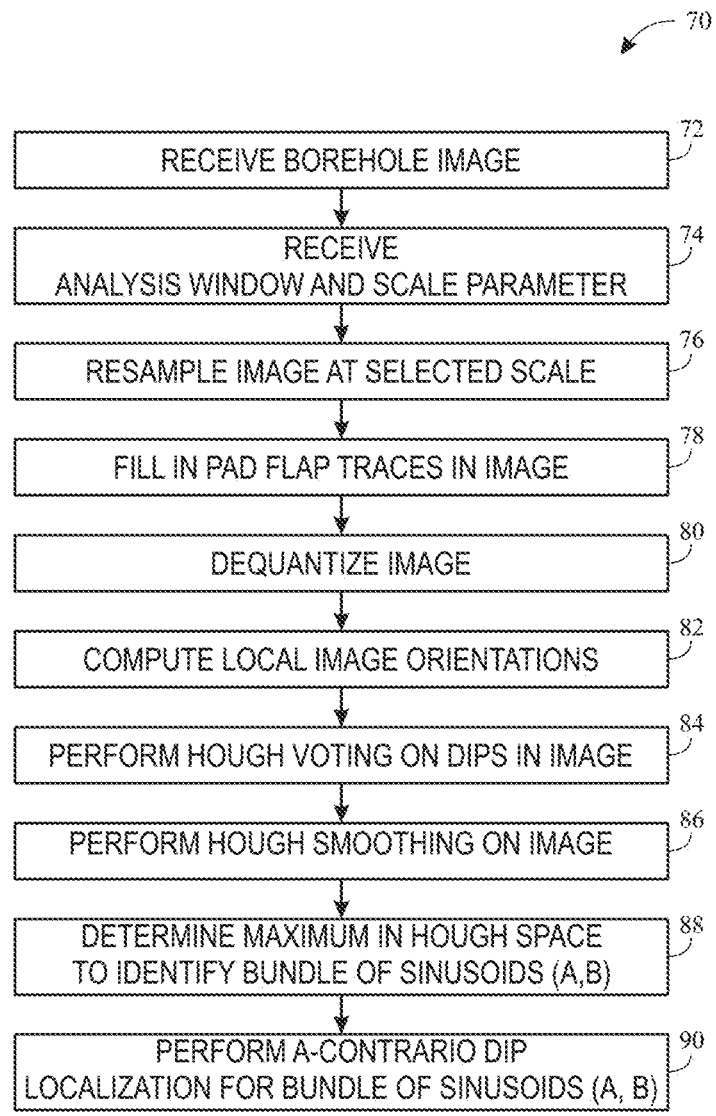
FIG. 3 is a flow chart of a method for identifying sinusoids (e.g., dips) in a borehole image obtained via the well-logging tool of FIG. 1, in accordance with an embodiment.

Accordingly, the presently disclosed embodiments are related to automatically extracting the sinusoids 58 that may be present in the borehole image data. In other words, the systems and techniques described herein may compute the orientation of a bundle of sinusoids (e.g., the average dip orientation) appearing on a small strip of the borehole image. FIG. 3 illustrates a flow chart of a method 70 for automatically identifying sinusoids 58 that may be present in borehole image data. Although the following description of the method 70 is described as being performed by the data processing system 28, it should be noted that the method 70 may be performed by any suitable computing system. Moreover, although the method 70 is described as being performed in a particular order, it should be understood that the method 70 may be performed in any suitable order and is not limited to the order presented herein.

Referring now to FIG. 3, at block 72, the data processing system 28 may receive borehole image data that may have been acquired by the downhole tool 12 described above or by some other logging tool. The borehole image data may be provided in a similar fashion as the flat image 56 described above having a size defined by width (W)×height (H), which corresponds to the cylinder-shaped surface of the borehole. To simplify the exposition, the following description of the method 70 employs units in a three-dimensional (3D) space where the radius of the cylinder of the wellbore 16 is set as 1.

The borehole image data may include high-resolution measurements that may enable the data processing system 28 to characterize the formation dips. As showed in FIG. 2, the imaging measurements may be acquired from a cylinder-shaped borehole image and the unrolling of this image. Upon unrolling the cylinder-shaped borehole image, the horizontal axis may be the apparent azimuth angle and the vertical axis may be the measured depth. Any planar surface (e.g., formation dip) crossing the borehole may be observed by the data processing system 28 and may result in a one period sinusoid on the flat image 56.

At block 74, the data processing system 28 may receive a window depth (τ) that corresponds to a portion of the borehole image data and a scale parameter to analyze the borehole image data. The data processing system 28 may use the window depth (τ) to evaluate different portions of the borehole image data. That is, the data processing system 28 may perform the remaining blocks of the method 70 described herein on a sliding window along the borehole measured depth to obtain a smooth curve of the formations dips (a(τ), b(τ)) that represents the evolution of the strata along the wellbore 16. The scale parameter may be a predetermined parameter or may be optimized before processing the image in function of the features represented on the image.

After receiving the scale parameter, the data processing system 28 may resample the borehole image at the provided scale parameter at block 76. As such, the remaining blocks of the method 70 may be performed on the resampled scale borehole image to provide more accurate extraction of sinusoids.

Figure 4:
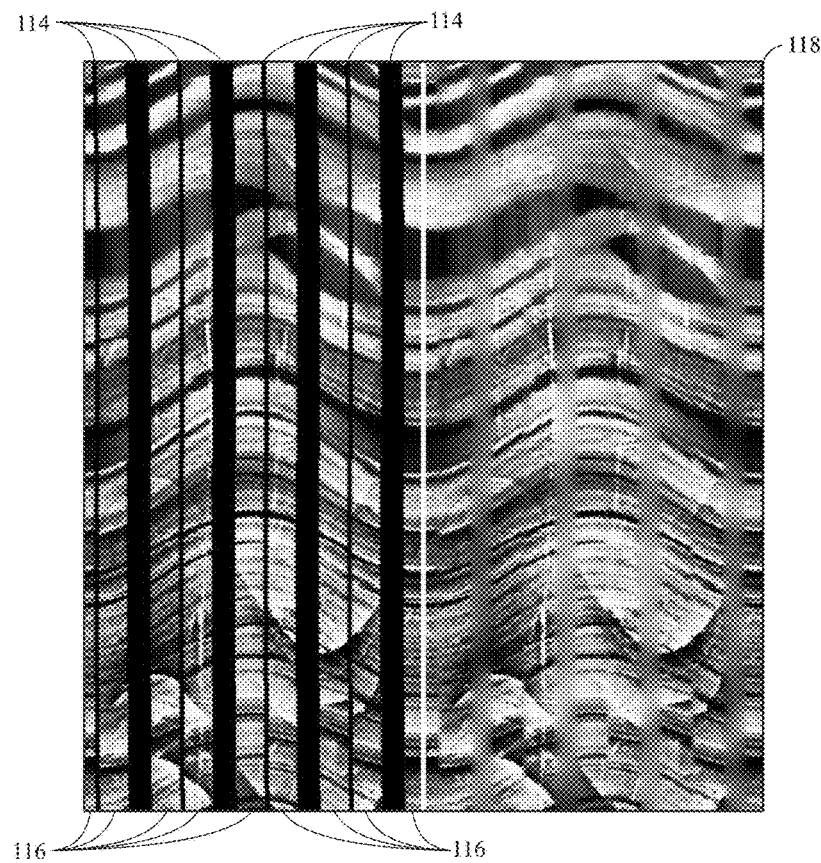
FIG. 4 includes example images that illustrate how pad flap traces in a borehole image may be filled, in accordance with an embodiment.

For borehole image data acquired via a wireline downhole tool, at block 78, the data processing system 28 may fill-in pad flap traces in the borehole image data. That is, if the borehole image data was acquired via a wireline downhole tool, the resulting borehole image may include portions of missing data, as illustrated in an example borehole image 112 of FIG. 4. As shown in the borehole image 112, portions 114 of the borehole image 112 may not include data. As such, the data processing system 28 may fill-in the path traces of these portions to provide a more complete depiction of the borehole image 112 via any appropriate well known method.

It should be noted that if the borehole image data was previously acquired by certain tools, such as a logging-while-drilling tool, the data processing system 28 may omit block 74. That is, certain downhole tools 12 may acquire borehole images that do not include the missing data.

Referring back to FIG. 3, at block 80, the data processing system 28 dequantizes the resulting borehole image. In one embodiment, when dequantizing the borehole image, the data processing system 28 may apply a Gaussian blur (σ) to the borehole image. Generally, the borehole image may include certain quantization or noise artifacts. These artifacts are due to the gradient direction of a quantized image not being uniformly distributed, but, instead, having a discrete irregular distribution. The artifacts may become visible after local image orientations regarding the borehole image are determined (block 82) using a Hough transform or the like. Examples of the artifacts will be discussed below with reference to FIG. 5. As such, by dequantizing the borehole image, the data processing system 28 may filter at least a portion of the artifacts from the Hough transformed image. The applied Gaussian blur may be a predetermined blur or may be optimized depending on the features shown on the borehole image.

After dequantizing the borehole image, at block 82, the data processing system 28 may compute the local image orientations regarding the borehole image. The local image orientations may include information regarding the sinusoids present in the borehole image. In one embodiment, the data processing system 28 may determine the local image orientations of the borehole image based on a pixel-wise estimation of the local orientation of the borehole image. As such, the data processing system 28 may use an image gradient $\nabla I = (\partial_x I, \partial_y I)$, which can be computed with a finite difference scheme, of the borehole image. In some embodiments, the Hough transform may be applied to the local orientations after the data processing system 28 may compute the local image orientations regarding the borehole image.

Another local image orientation descriptor may include a structure tensor. The structure tensor may include a field representing a local average direction (mod π) of the gradient vectors (mod 2π). The structure tensor field S may be computed from the image gradients field ∇I by smoothing the singular matrix field ∇I⊗ ∇I: S=$G_\mu$*∇I⊗ ∇I, where $G_\mu$ is a Gaussian kernel, I is the borehole image, and ⊗ is the outer product to a pair of vectors. As a result, the structure tensor field S may be a matrix, such that in the case of real vectors, the outer product of a pair of vectors (i, j) is i⊗j=$ij^T$. In one embodiment, the data processing system 28 may determine the local image orientations of the borehole image I based on the matrix S(i,j) representing the structure tensor field S. The eigenvector of the matrix with largest eigenvalue may be associated to the local orientation of the matrix S(i,j), and the strength of this orientation may correspond to the largest eigenvalue. The largest eigenvector of the matrix S(i, j) is considered as local orientation (u, v) in the following. However, the local orientations may be obtained from any appropriate method.

As mentioned above, the data processing system 28 may also compute the dip orientation of the borehole image using a Hough transform based on data relative to local orientations (orientation computed on each pixel) computed previously. In particular the method comprises applying a Hough transform to the dequantized image based on the local orientations (u, v) determined via the eigenvectors, and on the associated eigenvalue. As such, the data processing system 28 may determine the orientation of main bundle of sinusoids (e.g., the dip inclination and azimuth angle) appearing on a window portion (τ) of a borehole image. As discussed above, the size of the borehole image may be described as having W×H dimensions, which corresponds to a cylinder. After applying the Hough transform, the data processing system 28 may output a pair of numbers (a, b) that identify a bundle of planes of the form Z=aX+bY+c (with c representing the measured depth and having a variable value) where Z is the direction of the axis of the cylinder and X points towards the north. As such, the pair (a, b) may describe a bundle of parallel formation dips that are depicted in the borehole image. It should be noted that the dip inclination and azimuth are recovered directly from the values of a and b.

In certain embodiments, applying the Hough transform and determining the pair of numbers (a, b) corresponding to the dip orientation may involve scanning the borehole image, such that at each point or pixel of the image (i,j)∈[0, W−1]×[0, H−1], the local image orientation (u, v) determined previously corresponds to a three-dimensional (3D) vector $$\left(-v\,\sin\!\left(i\frac{2\pi}{W}\right),\,-v\,\cos\!\left(i\frac{2\pi}{W}\right),\,u\right)$$

to the cylinder-shaped borehole image 52 at the pixel location $$\left(R\,\cos\!\left(i\frac{2\pi}{W}\right),\,R\,\sin\!\left(i\frac{2\pi}{W}\right)\right),\,j+\tau\right).$$

Figure 5:
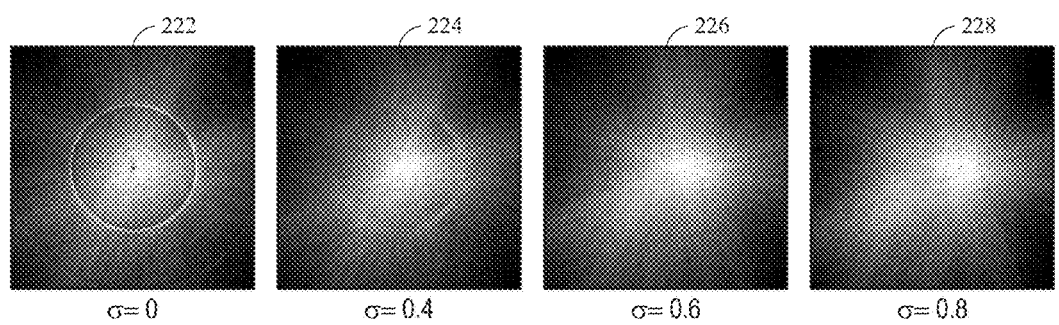
FIG. 5 illustrates effects of image dequantization of a borehole image obtained via the well-logging tool of FIG. 3, in accordance with an embodiment.

Keeping this in mind, FIG. 5 illustrates example images of Hough transform versions of the borehole image. As shown in FIG. 5, the Hough transform images include various pixel intensities at different parts of the respective image. The images depicted in FIG. 5 also illustrate the effect of dequantizing the borehole image before applying the Hough transform. That is, image 222 corresponds to a Hough transform of a borehole image that includes no dequantization. As such, the image 222 illustrates non-uniformity across the image as a set of concentric circles around the origin of coordinates.

However, as the Gaussian blur (σ) increases, the artifacts on the transformed image become less visible as illustrated in images 224, 226, and 228. As such, the data processing system 28 may more easily locate the maximum pixel values of the transformed image. The maximum value depicted on the Hough transformed image gives an estimation of the orientation of the sinusoid.

With this in mind, the data processing system 28 may determine the local image orientation of the borehole image by identifying the planes that satisfy the condition $$-av\,\sin\!\left(i\frac{2\pi}{W}\right)+bv\,\cos\!\left(i\frac{2\pi}{W}\right)+u=0$$

using the Hough transformed image. The condition may correspond to the equation of a straight line in the (a, b) plane (e.g., transformed space). There are then a plurality of possible pairs of numbers (a, b) solving the preceding equation for each pixel of the borehole image.

Referring back to FIG. 3, at block 84, the data processing system 28 may perform Hough voting. In one embodiment, when employing the Hough voting technique, the data processing system 28 may accumulate a vote for the points satisfying this equation on the discretized (a, b) plane. That is, each pixel in the borehole image votes for a straight line that solves the above equation for this pixel in the Hough transformed space.

Each point in the Hough transformed space corresponds to a dip orientation. The data processing system 28 may then sum the votes obtained by each point in the Hough transformed space to determine a vote score for the point and the corresponding dip orientation.

The data processing system 28 may determine which point and which associated dip orientation correspond to the highest vote score (block 88), i.e. a maximum in the Hough space. That is, the points that have the most votes correspond to the most plausible family of sinusoids (or dip orientation) within the borehole image. Instead of extracting only one (a, b) value corresponding to a global maximum, the method may include determining a plurality of local maxima ($a_1$, $b_1$) ($a_2$, $b_2$) in the Hough transformed space, etc. It should be noted that by applying the Hough transform using a sliding window at depth τ, the data processing system 28 may obtain a smooth curve of dip orientations (a(τ), b(τ)) that represents the evolution of the strata along the wellbore 16.

The advantage of this strategy, when compared to finding the three parameters (a, b, c) of a plane Z=aX+bY+c using the same technique, is that the votes are accumulated on a 2D space, instead of a 3D space. As such, the data processing system 28 may extract the sinusoids more quickly with negligible quantization artifacts.

In another embodiment, the data processing system may employ at block 84 a randomized voting technique that may consider pairs of points in the Hough transformed image. As such, each pair of pixels in the image domain may vote for a single point in the Hough transformed domain. This point in the Hough transformed domain is computed as the intersection of the straight lines corresponding to each of the two image pixels. The strength of the vote is a function of the local orientation strengths of the two pixels, for instance the product, the sum, or the minimum.

Referring again to FIG. 3, the data processing system 28 may perform optional Hough smoothing on the Hough transformed image (block 86) before determining the maximum in Hough space. In one embodiment, the Hough space may be discretized as a regular grid of size K×K centered at the coordinate (0,0) of the (a,) plane. The range of values (a, b) considered in this grid may optionally be reduced in view of the features of the image. In some embodiments, to improve the localization of the maxima, the data processing system 28 may smooth the Hough transform with a Gaussian filter.

After determining the dip orientation based on the maximum in the Hough space at block 88, the data processing system 28 may perform an a-contrario dip localization operation for the identified bundle of sinusoids. That is, the data processing system 28 may determine whether the identified sinusoid having the predetermined dip orientation at a particular measured depth is possible.

Given the parameters (a, b) of the identified bundle of sinusoids for the current analysis window, the data processing system 28 may, at block 90, determine if a sinusoid having the predetermined dip orientation is meaningful or actually present at a predetermined measured depth h. From this operation, the data processing system 28 may extract the individual dips from the borehole image.

In one embodiment, an a-contrario validation algorithm may be used to verify that a sinusoid having the predetermined dip orientation is present at a predetermined measured depth. The a-contrario validation may include applying a statistical test to reject accidental matches of the sinusoids. The proposed a-contrario validation technique may validate the match of an image gradient angle to the detected sinusoid at various measured depths.

With the foregoing in mind, the data processing system 28 may receive the parameters (a, b) and an analysis window of height H. For each measured depth h in the height H of the window, the data processing system 28 may trace the detected sinusoid with the predetermined parameters (a, b) on the image with coordinates (i,j) for the current depth h and excluding the index (i,j) where there is no data. The trace may be determined based on the following equation.

$$J(i) = a \, \cos\left(\frac{2\pi}{W}i\right) + b \, \sin\left(\frac{2\pi}{W}i\right) + h \quad (1)$$

where the radius of the borehole is set to 1 and W is the image width.

The data processing system 28 may then determine a normal vector to the traced sinusoid according to the following equation.

$$n(i) = \left[\frac{2\pi}{W}a \, \sin\left(\frac{2\pi}{W}i\right) - \frac{2\pi}{W}b \, \cos\left(\frac{2\pi}{W}i\right), 1\right] \quad (2)$$

The data processing system 28 may then determine an observed image orientation for the traced sinusoid according to Equation 3.

$$g(i) = [u_x(i,J(i)), u_y(i,J(i))] \quad (3)$$

$(u_x, u_y)$ is a local image orientation that can be chosen among the orientations described above. The data processing system 28 may then determine a number of pixels in the image that are compatible with the formation dip being evaluated according to Equation (4).

$$\tau = \Sigma_i[\text{Angle}(n(i), g(i)) < p] \quad (4)$$

where [condition] is equal to 1 when the condition is verified and 0 otherwise. In this case, the data the condition is that the angle between n(i) and g(i) (calculated in the range 0-90°) is between 0 and p degrees.

The data processing system 28 may then compute a number of false alarms (NFA) value according to Equation 5. The NFA value is a predetermined statistical value corresponding to an upper bound of the mean number of dips validated during the test whereas they do not correspond to a real sinusoid on the image. As such, the NFA value provides a measure of the quality of the detection. That is, the lower its value, the less probable it corresponds to false detection of a formation dip, and thus the more probable it corresponds to a real dip.

$$NFA = K^2 \times H \times B\left(N, \tau, \frac{p}{90}\right) \quad (5)$$

$$\text{where } B(N, \tau, P) = \sum_{k=\tau}^{N} \binom{N}{k} P^k (1-P)^{N-k} \quad (6)$$

As mentioned above, K×K is the size of the discretization grid defined for the Hough smoothing process. N is the total number of points in the Hough transformed image, and p is an angular tolerance value.

The parameter ∈ corresponds to an upper bound to the number of false alarms one can accept per window. As such, the data processing system 28 may only keep candidates with NFA <∈. If the data processing system 28 determines that the NFA is less than some value ∈ (NFA<∈), the data processing system 28 may validate the detected formation dip at depth h.

With the foregoing in mind, if the data processing system 28 determines that no sinusoidal structures (i.e., compatible with a, b) are validated at none of the measured depth h, then the data processing system 28 may invalidate the predetermined dip orientation. If a plurality of possible dip orientations $(a_1, b_1)$ & $(a_2, b_2)$ have been determined at block 88, it should be noted that the data processing system 28 may perform block 90 for available parameter $(a_1, b_1)$ & $(a_2, b_2)$. If no formation dip is detected for any candidate plane orientation, then either additional maxima may be extracted from the Hough transform image and tested or the system 28 may determine that the window does not include sinusoids.

After performing the method 70 described above, the data processing system 28 may identify the formation dips present in the borehole image. In one embodiment, the data processing system 28 may output an image or information regarding locations of the formation dips in the borehole image, which corresponds to the wellbore 16, on a display, printer, storage component or the like. The location of the formation dip in the wellbore 16 may then be used to determine how the wellbore 16 should be drilled (e.g., angle, depth), identify locations of potential hydrocarbon reservoirs, identify desired locations for extracting hydrocarbon deposits, and the like.

In certain embodiments, the data processing system 28 may repeat the method 70 described above for each window depth of the borehole image. As such, the data processing system 28 may identify the formation dips present in the entire borehole image.

It should be noted that the data processing system 28 may use a multi-scale pyramid data structure for exploring the borehole image. The multi-scale pyramid data structure is related to the union of several vertically down-scaled versions of the original image. The down-scaled versions of the original image may be down-scaled according to factors that are successive powers of two, called "octaves," as illustrated in FIG. 6.

Figure 6:
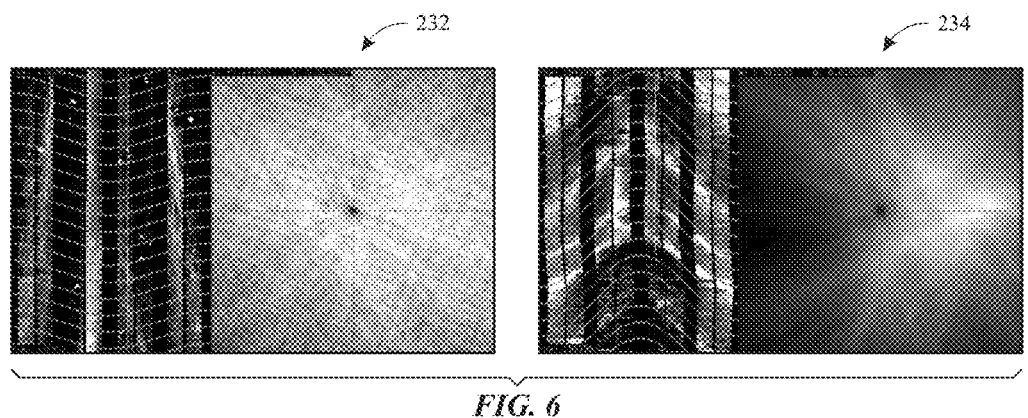
FIG. 6 depicts different scales of a borehole image obtained via the well-logging tool of FIG. 3, in accordance with an embodiment.

As shown in image 232 of FIG. 6, when the drilling direction is nearly parallel to the geological strata, the image contains nearly vertical structures. These patterns are actually sinusoids of very large amplitude, as can be seen by compressing the image 232 by a large factor in the vertical direction, as depicted in image 234. The presently disclosed embodiments enable the data processing system 28 to correctly find these sinusoids after they appear entirely inside the selected region of interest.

Figure 7:
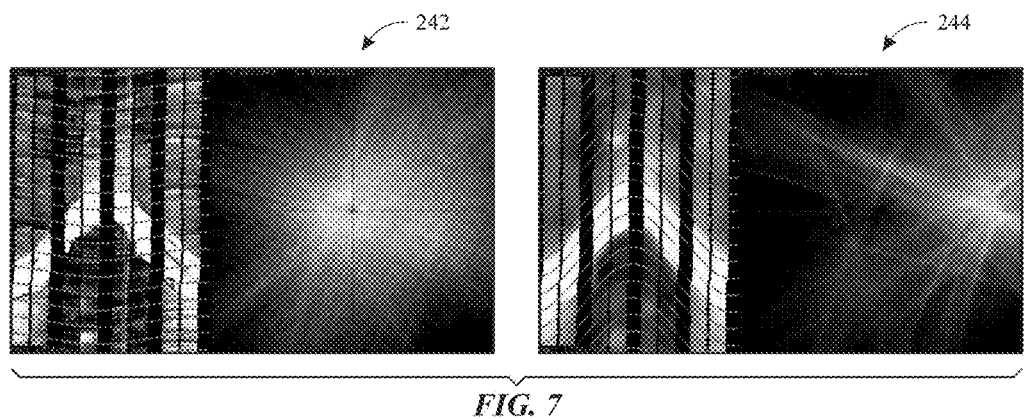
FIG. 7 depicts different blurs applied to a borehole image obtained via the well-logging tool of FIG. 3, in accordance with an embodiment.

In addition to using scaled versions of the borehole image, it should be noted that varying the Gaussian blur ($\sigma$) value employed at block 80 of the method 70 may prove valuable when two meaningful formation dips on present the same area such as a background composed of very thin strata on one direction and a few thick strata on a different direction. As shown in image 242 of FIG. 7, when the data processing system 28 uses a small blur (e.g., $\sigma=1$), the votes of all the pixels in the background of the image are consistent with one dip, and the single thick sinusoid covers only small area of the whole image. However, as indicated in the image 244 of FIG. 7, when using a larger blur (e.g., $\sigma=20$), the data processing system 28 may produce an image, such that the thin strata has disappeared, and the votes are primarily related to those of the single thick sinusoid, which is correctly detected by the data processing system 28.

It should be noted that the maxima computed for different parameters of the blur $\sigma$ are considered as possible independent planes for the current window depth. In certain embodiments, the data processing system 28 may apply the method to a same borehole image dequantized with different blurs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In particular, the disclosure related to a method, comprising receiving, via a processor, image data representative of a borehole image obtained by a downhole tool; generating, via the processor, dequantized image data based on the image data, wherein the dequantized image data filters one or more artifacts present in a Hough transformed version of the image data; determining, via the processor, one or more possible dip orientations associated with one or more formation dips present in the image data based on the dequantized image data; performing, via the processor, an a-contrario validation algorithm for the one or more formation dips to verify whether at least a formation dip having the or one of the possible dip orientation is present at a predetermined measured depth in the image data.

The dip orientation comprises an inclination and an azimuth angle, and a dip is defined by the dip orientation and the measured depth of the dip. Further, the one or more formation dips correspond to one or more sinusoids present in the image data.

Generating the dequantized image data may comprise applying a Gaussian blur to the image data.

Determining one or more possible dip orientations may include determining, via the processor, local orientations of each pixel of the borehole image. Determining the one or more possible dip orientations may also comprise applying a Hough transform to the dequantized image data. The Hough transform may be applied based on the local orientations.

Determining the one or more possible dip orientation may comprise performing, via the processor, Hough voting on the one or more local orientations, representing the votes in a Hough transformed image, the determination being based on the Hough voting. The one or more possible dip orientation may correspond to a local or global maximum of the Hough transformed image.

The method may additionally comprise performing, via the processor, Hough smoothing on the Hough transform image before determining the one or more possible dip orientation.

Determining the dip orientation may also include using a sliding window on the borehole image, the determination being performed for each window.

Further, performing an a contrario validation algorithm comprises using statistical tests.

The method may also include determining an optimal scale parameter of the borehole image and scaling the image data according to the scale parameter before dequantizing the image. The method may also or additionally include scaling the image data according to a plurality of scaling parameters in order to obtain from a borehole image a plurality of scaled image, wherein the method comprise determining formation dips from at least two scaled images of the plurality.

The method may also include determining an optimal blur parameter and applying the Gaussian blur according to the optimal blur parameter. The method may also or additionally include applying a plurality of Gaussian blurs to the image data, each Gaussian blur being according to a specific blur parameter in order to obtain from a borehole image a plurality of dequantized images, wherein the method comprises determining formation dips from at least two dequantized images of the plurality.

The disclosure also relates to a system, comprising a downhole tool configured to be disposed within a wellbore of a well, wherein the downhole tool is configured to acquire measurements regarding the wellbore, and wherein the measurements are used to generate an image of the wellbore; and a processor configured to identify one or more formation dips within the image by:

receiving the image;

generating a dequantized image based on the image, wherein the dequantized image filters one or more artifacts present in a Hough transformed version of the image;

determining one or more possible dip orientations associated with one or more formation dips present in the image data based on the dequantized image data;

performing an a-contrario validation algorithm for the one or more formation dips to verify whether at least a formation dip having the or one of the possible dip orientation is present at a predetermined measured depth in the image data.

The downhole tool may comprise a wireline tool or a logging-while-drilling (LWD) tool. In particular, the downhole tool may comprise a drilling tool configured to drill into the wellbore based on the one or more formation dips.

The processor may also be configured to output data regarding the formation dips on a display.

The image may comprise a 360-degree image of a portion of the wellbore.

The invention claimed is:

1. A method, comprising:
receiving, via a processor, image data representative of a borehole image obtained by a downhole tool;
generating, via the processor, dequantized image data based on the image data, wherein the dequantized image data filters one or more artifacts present in a Hough transformed version of the image data;
determining, via the processor, one or more possible dip orientations associated with one or more formation dips present in the image data based on the dequantized image data;
performing, via the processor, an a-contrario validation algorithm for the one or more formation dips to verify whether at least a formation dip having the or one of the possible dip orientation is present at a predetermined measured depth in the image data.

2. The method of claim 1, wherein generating the dequantized image data comprises applying a Gaussian blur to the image data.

3. The method of claim 1, wherein determining one or more possible dip orientations includes determining, via the processor, local orientations of each pixel of the borehole image.

4. The method of claim 1, wherein determining the one or more possible dip orientations comprise applying a Hough transform to the dequantized image data.

5. The method of claim 3, wherein determining the one or more possible dip orientations comprise applying a Hough transform to the dequantized image data and wherein determining the one or more possible dip orientation comprises performing, via the processor, Hough voting on the one or more local orientations, representing the votes in a Hough transformed image, the determination being based on the Hough voting.

6. The method of claim 5, wherein the one or more possible dip orientation correspond to a local or global maximum of the Hough transformed image.

7. The method of claim 4, comprising performing, via the processor, Hough smoothing on the Hough transform image before determining the one or more possible dip orientation.

8. The method of claim 1, wherein determining the dip orientation includes using a sliding window on the borehole image, the determination being performed for each window.

9. The method of claim 1, wherein performing an a contrario validation algorithm comprises using statistical tests.

10. The method of claim 1, including determining an optimal scale parameter of the borehole image and scaling the image data according to the scale parameter before dequantizing the image.

11. The method of claim 1, including scaling the image data according to a plurality of scaling parameters in order to obtain from a borehole image a plurality of scaled image, wherein the method comprise determining formation dips from at least two scaled images of the plurality.

12. The method of claim 2, comprising determining an optimal blur parameter and applying the Gaussian blur according to the optimal blur parameter.

13. The method of claim 2, comprising applying a plurality of Gaussian blurs to the image data, each Gaussian blur being according to a specific blur parameter in order to obtain from a borehole image a plurality of dequantized images, wherein the method comprises determining formation dips from at least two dequantized images of the plurality.

14. A system, comprising:
a downhole tool configured to be disposed within a wellbore of a well, wherein the downhole tool is configured to acquire measurements regarding the wellbore, and wherein the measurements are used to generate an image of the wellbore;
a processor configured to identify one or more formation dips within the image by:
receiving the image;
generating a dequantized image based on the image, wherein the dequantized image filters one or more artifacts present in a Hough transformed version of the image;
determining one or more possible dip orientations associated with one or more formation dips present in the image data based on the dequantized image data;
performing an a-contrario validation algorithm for the one or more formation dips to verify whether at least a formation dip having the or one of the possible dip orientation is present at a predetermined measured depth in the image data.

15. The system of claim 14, comprising a drilling tool configured to drill into the wellbore based on the one or more formation dips.

* * * * *